(12) United States Patent
Trnka

(10) Patent No.: US 9,614,388 B2
(45) Date of Patent: Apr. 4, 2017

(54) OUTPUT STAGE OF A CHARGING DEVICE, INCLUDING A TRANSFORMER, RECTIFIER, CONVERTER, CAPACITOR, STORAGE DEVICE AND A USE THEREOF

(71) Applicant: Siemens Aktiengesellschaft, München (DE)

(72) Inventor: Alexander Trnka, Gerasdorf bei Wien (AT)

(73) Assignee: SIEMENS AKTIENGESELLSCHAFT, München (DE)

( * ) Notice: Subject to any disclaimer, the term of this patent is extended or adjusted under 35 U.S.C. 154(b) by 229 days.

(21) Appl. No.: 14/397,004

(22) PCT Filed: Apr. 16, 2013

(86) PCT No.: PCT/EP2013/057930
§ 371 (c)(1),
(2) Date: Oct. 24, 2014

(87) PCT Pub. No.: WO2013/160157
PCT Pub. Date: Oct. 31, 2013

(65) Prior Publication Data
US 2015/0102766 A1    Apr. 16, 2015

(30) Foreign Application Priority Data

Apr. 27, 2012  (AT) ............................... A 50150/2012

(51) Int. Cl.
*H01M 10/46*   (2006.01)
*H02J 7/00*    (2006.01)
(Continued)

(52) U.S. Cl.
CPC ............ *H02J 7/0052* (2013.01); *H02J 7/025* (2013.01); *H02M 7/10* (2013.01); *H02M 2001/0093* (2013.01)

(58) Field of Classification Search
CPC ..... H02J 2007/0059; H02J 7/0063; H02J 7/04
(Continued)

(56) References Cited

U.S. PATENT DOCUMENTS 4,748,342 A   5/1988  Dijkmans
4,999,795 A   3/1991  Lapeyre
(Continued)

FOREIGN PATENT DOCUMENTS

DE    196 37 361      3/1998
EP    0420074 A1      4/1991
(Continued)

OTHER PUBLICATIONS

International Search Report issued by the European Patent Office in International Application PCT/EP2013/057930.

*Primary Examiner* — Edward Tso
(74) *Attorney, Agent, or Firm* — Henry M. Feiereisen LLC.

(57) ABSTRACT

An output stage of a charging device includes a first secondary winding of a transformer, a first rectifier which is connected to the first secondary winding, a step-down controller which is connected to the output of the first rectifier, and a first output capacitor. In order to be able to reduce the switching losses in the switch of the step-down controller and to reduce the magnitudes of the inductance, the transformer includes a second secondary winding to which a second rectifier) together with a second output capacitor are connected, wherein the first and second output capacitors are connected in series.

5 Claims, 2 Drawing Sheets

(51) Int. Cl.
*H02M 7/10* (2006.01)
*H02J 7/02* (2016.01)
*H02M 1/00* (2006.01)

(58) Field of Classification Search
USPC ............. 320/107, 116, 166, 140; 363/67, 69
See application file for complete search history.

(56) References Cited

U.S. PATENT DOCUMENTS

| | | | |
|---|---|---|---|
| 5,162,663 | A | 11/1992 | Combs |
| 5,282,122 | A | 1/1994 | Summer |
| 5,363,287 | A * | 11/1994 | Liu .................... H02M 1/44 363/20 |
| 6,205,036 | B1 * | 3/2001 | Anzawa ............. H02J 7/0018 363/20 |
| 6,234,037 | B1 | 5/2001 | Zimmer |
| 6,328,655 | B1 | 12/2001 | Zimmermann |
| 2004/0038766 | A1 | 2/2004 | Yamasaki |
| 2005/0030772 | A1 * | 2/2005 | Phadke ............... H02M 1/4225 363/71 |
| 2006/0053965 | A1 | 3/2006 | Wittenstein |
| 2006/0075838 | A1 | 4/2006 | Hacker |
| 2008/0174276 | A1 * | 7/2008 | Takahashi ............... H02J 9/061 320/128 |
| 2012/0063177 | A1 * | 3/2012 | Garrity .................... H02J 3/383 363/37 |
| 2013/0200708 | A1 * | 8/2013 | Ni .......................... H02J 9/061 307/66 |

FOREIGN PATENT DOCUMENTS

| | | |
|---|---|---|
| EP | 1047172 A2 | 10/2000 |
| EP | 1 326 032 | 7/2003 |
| EP | 2437386 A1 | 4/2012 |
| JP | H0998569 A | 4/1997 |
| SU | 1259434 A1 | 9/1986 |
| WO | WO 99/06743 | 2/1999 |
| WO | WO 03/100278 | 12/2003 |
| WO | WO 2004/005763 | 1/2004 |

* cited by examiner

OUTPUT STAGE OF A CHARGING DEVICE, INCLUDING A TRANSFORMER, RECTIFIER, CONVERTER, CAPACITOR, STORAGE DEVICE AND A USE THEREOF

CROSS-REFERENCES TO RELATED APPLICATIONS

This application is the U.S. National Stage of International Application No. PCT/EP2013/057930, filed Apr. 16, 2013, which designated the United States and has been published as International Publication No. WO 2013/160157 and which claims the priority of Austrian Patent Application, Serial No. A 50150/2012, filed Apr. 27, 2012, pursuant to 35 U.S.C. 119(a)-(d).

BACKGROUND OF THE INVENTION

Technical Field

The invention relates to an output stage of a charging device, comprising at least
  a first secondary winding of a transformer,
  a first rectifier which is connected to the first secondary winding,
  a step-down converter, which is connected to the output of the first rectifier, wherein a first output voltage is able to be tapped off at a first output capacitor.

As a rule a charging device comprises an input stage into which the feed voltage is fed, from the AC network or a semiconductor bridge for example, as an alternating voltage and is supplied to a primary winding of a transformer. The output stage of a charging device comprises the secondary winding of the transformer, a rectifier and a step-down converter. Such charging devices are employed for example in or for batteries of an electric vehicle.

A step-down converter (buck converter) generally has a switch, a diode, an input and an output capacitor and an inductance, such as a storage inductance as buffer for the energy. A semiconductor switch, mostly a transistor which contains a power semiconductor, is used as the switch. The output voltage which is supplied to a load or storage, such as just a battery, is able to be tapped off at the output capacitor.

Because the switching speeds of the transistors (e.g. IGBT, FET, SIC-FET) used as semiconductor switches in the step-down converter are becoming ever greater, correspondingly large switching losses arise in the transistor. It is basically true to say that the greater the cut-off voltage of the transistor is, the greater are the switching losses. For the inductance of the step-down converter it is true to say that: The greater is the voltage at the inductance, the greater is the ripple (the so-called "current ripple") of the voltage generated by the converter.

SUMMARY OF THE INVENTION

Presentation of the Invention

The object of the present invention is to make available an output stage of a charging device, which reduces the DC link voltage for the clocked part of the circuit (especially the voltage at the semiconductor switches of the step-down converter), i.e. for the part of the circuit which includes the inductance and the semiconductor switch (e.g. the transistor). This relates to the part of the circuit which is disposed in FIG. 1 between the two capacitors. This could enable the switching losses in the switch of the step-down converter to be decreased and the dimensions of the inductance to be reduced.

According to one aspect of the invention, an output stage of a charging device includes a first secondary winding of a transformer, a first rectifier connected to the first secondary winding, and a step-down converter connected to the output of the first rectifier and having a first output capacitor. The transformer of the output stage includes a second secondary winding, to which a second rectifier along with a second output capacitor is connected, wherein the first and second output capacitor are connected in series.

The output voltage for the load to be charged can be taken from the series circuit of the two output capacitors. This enables the voltage at the first output capacitor and thus in the step-down converter to be decreased by comparison with output stages with only one output capacitor, in order to make available the same voltage for the load.

A possible form of embodiment of the invention relates to a number of cascaded step-down converters being provided. These cascaded step-down converters are controlled in a known manner in phase opposition. A marked reduction in the ripple current is achieved in this way.

If first and second secondary winding are embodied so that the second secondary winding delivers less voltage than the first secondary winding, then it is guaranteed that an unregulated basic voltage will be provided by the second secondary winding and the second rectifier which is smaller than the regulated voltage which is generated by the first secondary winding, the first rectifier and the step-down converter. The ratio of the windings and thus of the voltages of the first and second secondary winding, with the same construction, can be roughly selected so that the second secondary winding has fewer windings than the first secondary winding.

It is advantageous for the ratio of the voltages of the first and second secondary windings to be matched to the storage to be charged. To do this there can be provision for the secondary winding to be embodied so that said winding makes available a basic voltage which corresponds to a lowest permissible voltage of the storage to be charged and the first secondary winding makes available an additional voltage, which supplements the basic voltage at a desired voltage for the storage to be charged. The storage to be charged might be a battery, such as the battery of an electric vehicle.

Accordingly a combination of an output stage of a charging device and storage is also covered by the invention, wherein the storage is connected to the inventive output stage so that it taps off the sum of the voltages of the two output capacitors.

As a result of the inventive embodiment of the output stage, the cut-off voltage of the transistors and the diodes can be reduced, through which fewer switching losses occur. And the dimensions of the inductance of the step-down converter (the step-down converter inductance) can be reduced while the switching frequency remains the same.

BRIEF DESCRIPTION OF THE DRAWING

For further explanation of the invention reference is made to the schematic figures in the following part of the description, from which further advantageous embodiments, details and developments of the invention can be taken. In the figures.

DETAILED DESCRIPTION OF PREFERRED EMBODIMENTS

Figure 1:
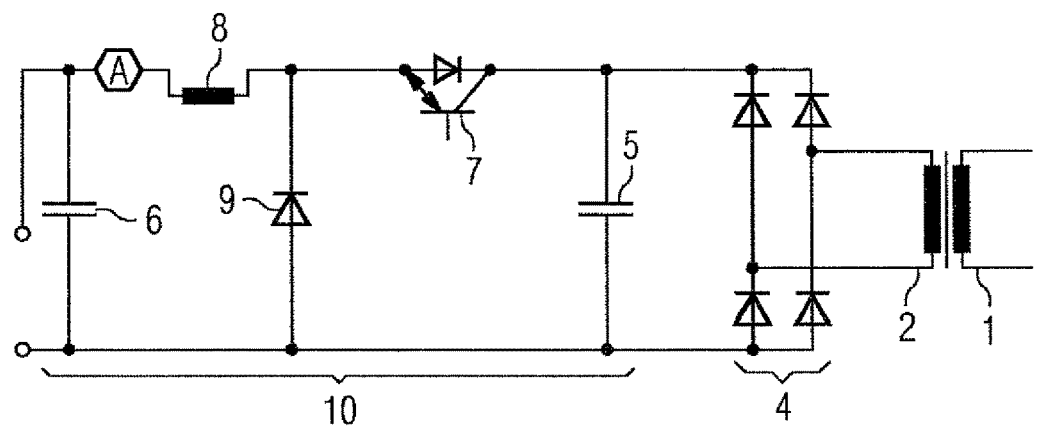
FIG. 1 shows an output stage according to the prior art with a step-down converter.

FIG. 1 shows an output stage for a charging device according to the prior art. It comprises the first and here only secondary winding 2 of a transformer, of which the primary winding 1 is also depicted. The secondary winding 2 is connected to the first and here only rectifier 4, which supplies the step-down converter 10 with voltage. This consists on an input capacitor 5, an output capacitor 6, a transistor 7, an inductance 8 and a diode 9. The output capacitor 6 makes available the output voltage at the terminals on the far left, which is used for charging a storage device.

In accordance with the invention the circuit from FIG. 1 is now expanded by a second secondary winding 3 of the transformer as well as the second rectifier 11, which likewise makes a part of the total output voltage available via a second output capacitor 12. The total output voltage is made up of the sum of the output voltages from output capacitor 6 of the step-down converter 10 and also from the second output capacitor 12.

If for example the storage device to be charged is the battery and a minimum battery voltage of 200 V is required for said battery, then it is not necessary to regulate the total voltage to below 200 V. Therefore the second secondary winding 3 is dimensioned so that an unregulated basic voltage of 200 V is present at the second output capacitor 12, while the first secondary winding is dimensioned so that, with the step-down converter 10, only a component of 300 V has to be effectively regulated. In total an overall output voltage of 500 V will thus be made available to the battery.

Figure 3:
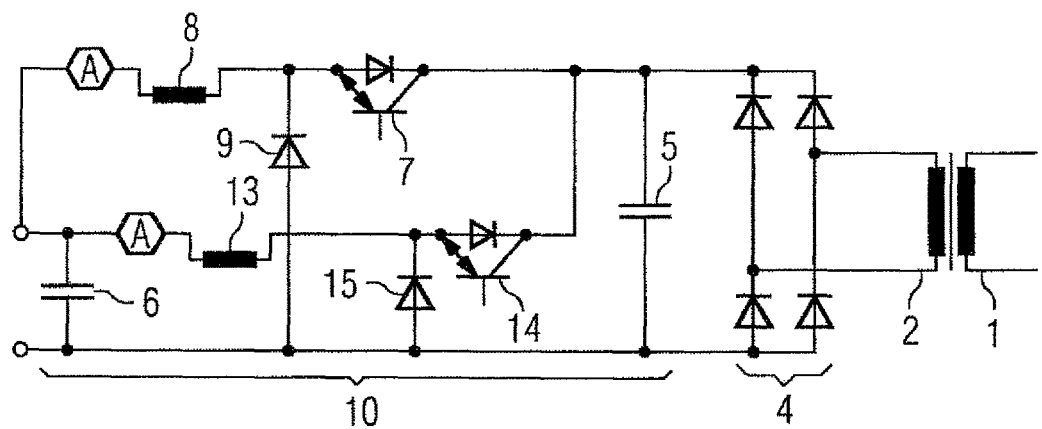
FIG. 3 shows an output stage according to the prior art with two cascaded step-down converters.
Figure 4:
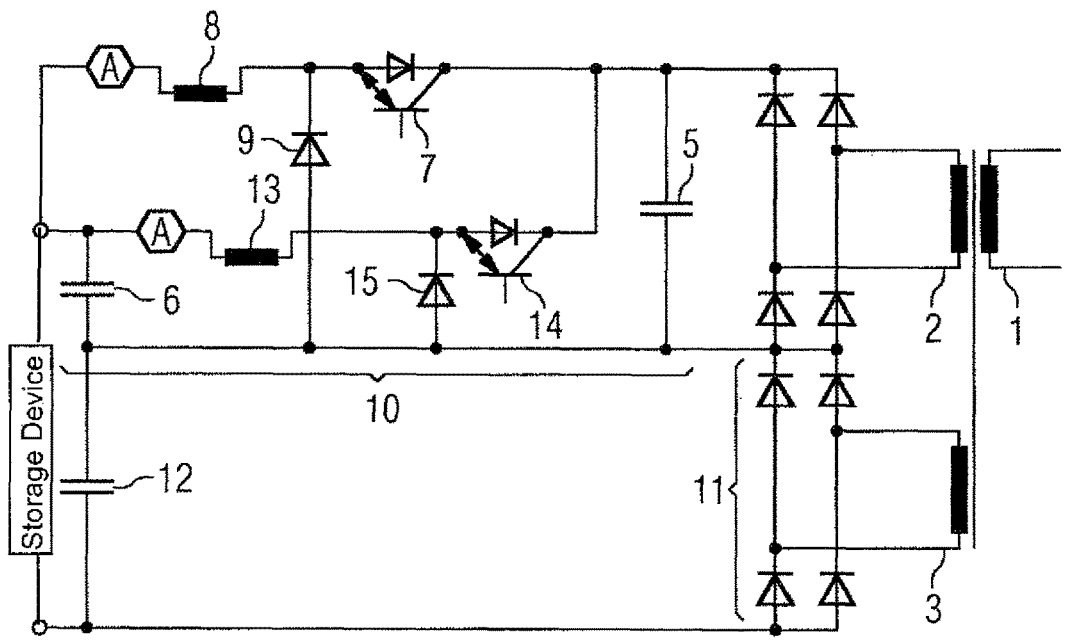
FIG. 4 shows an inventive output stage with two cascaded step-down converters.

FIG. 3 shows a further output stage according to the prior art, which can be improved in accordance with FIG. 4.

FIG. 3 differs from FIG. 1 in that a further step-down converter is provided, which is disposed cascaded in relation to the step-down converter 10 from FIG. 1 and includes a further inductance 13, a further transistor 14 and a further diode 15. The further step-down converter shares the input capacitor 5 and the output capacitors 6 with the step-down converter 10.

Figure 2:
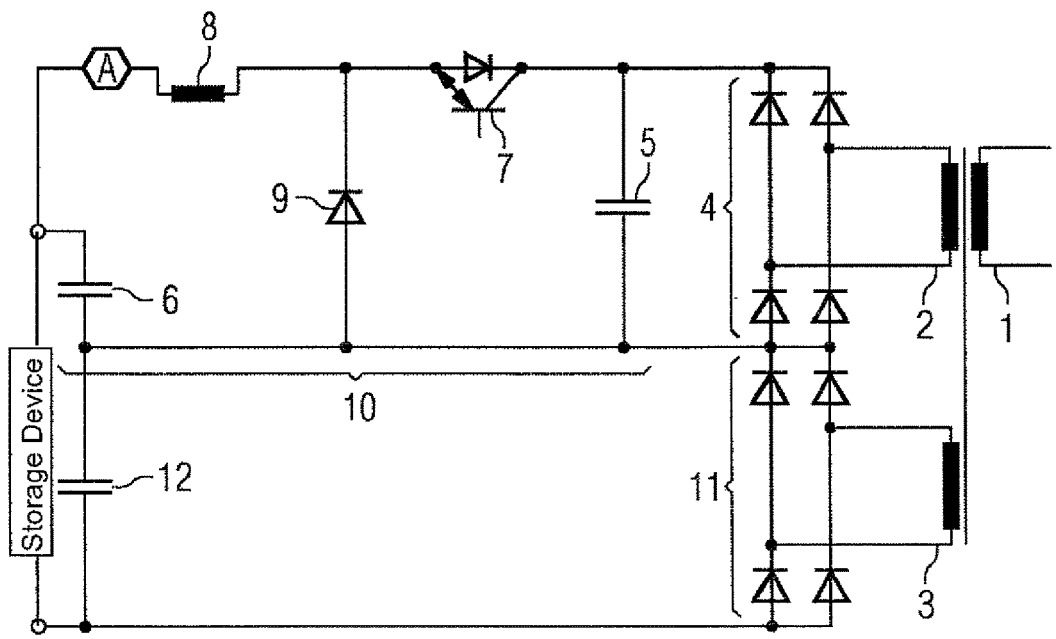
FIG. 2 shows an inventive output stage with a step-down converter.

In accordance with FIG. 4 this circuit is expanded in a similar way to FIG. 2 by a second secondary winding 3 of the transformer as well as by a second rectifier 11 and a second output capacitor 12.

Basically the inventive circuit is conceivable for purposes other than charging devices, with step-up converters as well, by the step-down converters thus being replaced by step-up converters.

The invention claimed is:

1. An output stage of a charging device, comprising:
a first secondary winding of a transformer,
a first rectifier connected to the first secondary winding,
a step-down converter connected to the output of the first rectifier and having a first output capacitor, said output stage providing an unregulated basic voltage by a second secondary winding of the transformer, to which a second rectifier and a second output capacitor is connected,
a second secondary winding of the transformer, and
a second rectifier and a second output capacitor connected to the second secondary winding,
wherein the first and the second output capacitor are connected in series.

2. The output stage as claimed in claim 1, comprising a plurality of cascaded step-down converters.

3. The output stage of claim 1, wherein the first and second secondary winding are configured so that the second secondary winding supplies a smaller voltage than the first secondary winding.

4. The output stage of claim 1, wherein the second secondary winding is configured so as to supply a basic voltage that corresponds to a smallest permissible voltage of a storage device to be charged and the first secondary winding supplies an additional voltage which increases the basic voltage to a desired voltage for the storage device to be charged.

5. An output stage of a charging device comprising
a first secondary winding of a transformer,
a first rectifier connected to the first secondary winding,
a step-down converter connected to the output of the first rectifier and having a first output capacitor, said output stage providing an unregulated basic voltage by a second secondary winding of the transformer, to which a second rectifier and a second output capacitor is connected,
a second secondary winding of the transformer,
a second rectifier and a second output capacitor connected to the second secondary winding,
wherein the first and the second output capacitor are connected in series and supply a sum voltage, and
a storage device connected to the series-connected first and the second output capacitors and receiving the sum voltage.

* * * * *